US012616635B2

(12) United States Patent
Lee et al.

(10) Patent No.: US 12,616,635 B2
(45) Date of Patent: May 5, 2026

(54) PERCUSSION APPARATUS FOR SPUTUM CLEARANCE

(71) Applicant: METABRAIN TECHNOLOGY PTE. LTD., Singapore (SG)

(72) Inventors: Shin-Da Lee, Taichung (TW); Bor-Tsang Wu, Tainan (TW); Liang-Wen Hang, Taichung (TW); Yun-Chu Ho, Taipei (TW)

(73) Assignee: METABRAIN TECHNOLOGY PTE. LTD., Singapore (SG)

(*) Notice: Subject to any disclaimer, the term of this patent is extended or adjusted under 35 U.S.C. 154(b) by 980 days.

(21) Appl. No.: 17/710,381

(22) Filed: Mar. 31, 2022

(65) Prior Publication Data

US 2022/0313544 A1 Oct. 6, 2022

(30) Foreign Application Priority Data

Apr. 1, 2021 (TW) ................................ 110112228

(51) Int. Cl.
*A61H 23/00* (2006.01)
*A61H 23/02* (2006.01)

(52) U.S. Cl.
CPC ........... *A61H 23/006* (2013.01); *A61H 23/02* (2013.01); *A61H 2201/165* (2013.01)

(58) Field of Classification Search
CPC ...... A61H 23/006; A61H 23/00; A61H 23/02; A61H 2023/002; A61H 2201/5002; A61H 2201/5069; A61H 23/06; A61H 2205/084; A61H 2023/0209–029; A61H 23/0236–0263; A61H 1/006–008
See application file for complete search history.

(56) References Cited

U.S. PATENT DOCUMENTS

| | | | | |
|---|---|---|---|---|
| 9,744,097 | B2 * | 8/2017 | DeVlieger | A61H 23/0218 |
| 2015/0305974 | A1 * | 10/2015 | Ehrenreich | A61B 5/6833 601/46 |
| 2018/0090119 | A1 * | 3/2018 | Soda | G10H 1/0558 |
| 2019/0247599 | A1 * | 8/2019 | Lee | A61M 16/0006 |
| 2020/0268601 | A1 * | 8/2020 | Antros | A61H 9/0057 |

* cited by examiner

*Primary Examiner* — Margaret M Luarca
*Assistant Examiner* — Sarah B Lederer
(74) *Attorney, Agent, or Firm* — MUNCY, GEISSLER, OLDS & LOWE, P.C.

(57) ABSTRACT

A percussion apparatus for sputum clearance includes a percussion unit, a drive unit, and a control unit, the percussion unit includes a percussion member and an angle detector, the angle detector is configured to detect an included angle between the reference plane and a horizontal plane, the control unit is electrically connected with the drive unit, and when the included angle conforms to a preset angle, the control unit controls the drive unit to drive the percussion unit to periodically percuss, which greatly saves the manpower and increase the efficiency of sputum clearance.

7 Claims, 11 Drawing Sheets

PERCUSSION APPARATUS FOR SPUTUM CLEARANCE

BACKGROUND OF THE INVENTION

Field of the Invention

The present invention relates to an assistive apparatus, and especially to a percussion apparatus for sputum clearance.

Description of the Prior Art

Generally, patients with respiratory diseases often suffer from the problem of sputum accumulation in the lungs, which makes the inflamed regions difficult to heal. The patients have to rely on others to assist in manual sputum clearance to expectorate the sputum. However, only experienced persons can accurately identify the regions where the sputum exists; it is necessary to identify the positions to be patted and to carry out sputum clearance at a proper angle; and the operation of sputum clearance is very labor-intensive. As a result, it is difficult to completely eliminate the problem of sputum accumulation.

The present invention is, therefore, arisen to obviate or at least mitigate the above-mentioned disadvantages.

SUMMARY OF THE INVENTION

The main object of the present invention is to provide a percussion apparatus for sputum clearance to obviate or at least mitigate the above-mentioned disadvantages.

To achieve the above and other objects, a percussion apparatus for sputum clearance is provided, including: a percussion unit, including a reference plane and an angle detector, the angle detector being configured to detect an included angle between the reference plane and a horizontal plane; a drive unit; and a control unit, electrically connected with the drive unit, wherein when the included angle conforms to a preset angle, the control unit controls the drive unit to drive the percussion unit to periodically percuss.

To achieve the above and other objects, a percussion apparatus for sputum clearance is provided, including: a wearable member; a plurality of percussion units, disposed on the wearable member, each of the plurality of percussion units including a reference plane and an angle detector, the angle detector being configured to detect an included angle between the reference plane and a horizontal plane; a drive unit; and a control unit, electrically connected with the drive unit, wherein when any one of the included angle associated one of the plurality of percussion units conforms to a preset angle, the control unit controls the drive unit to drive the associated one of the plurality of percussion units to periodically percuss.

The advantages of the present invention are: through at least one percussion unit, the control unit 4 can use the angle detector to allow the user to adjust the angle of the body to draw sputum at the proper angle; the sound receiver can be used to more accurately identify the body region where the sputum is located; and the drive unit can be used to drive the percussion unit to periodically percuss to assist sputum clearance. Compared with the conventional manual sputum clearance, it can greatly save the manpower and increase the efficiency of sputum clearance, so it can indeed achieve the purpose and object of the present invention.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
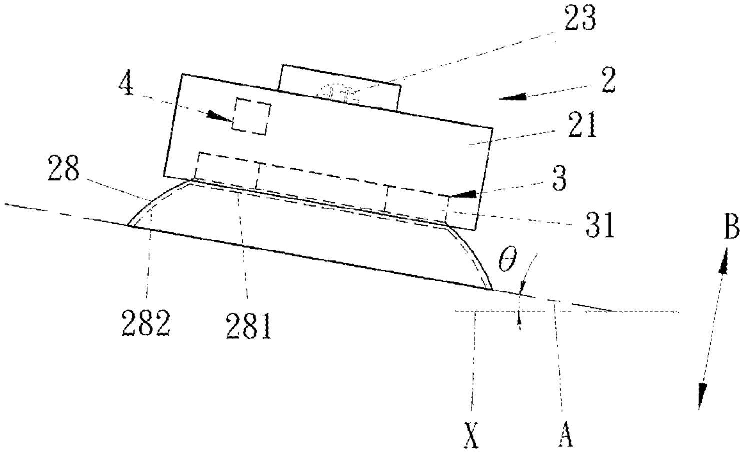
FIG. 1 is a drawing of a percussion apparatus for sputum clearance according to a first preferable embodiment of the present invention.
Figure 2:
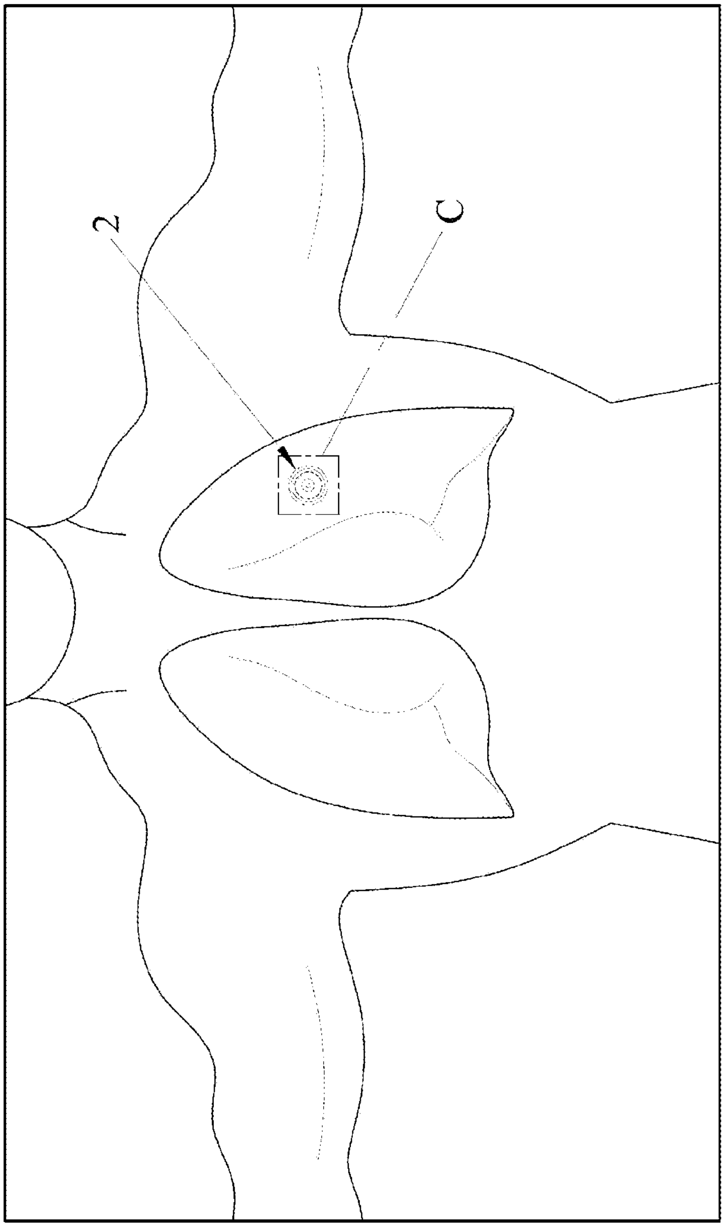
FIG. 2 is a drawing showing application of the percussion apparatus for sputum clearance according to the first preferable embodiment of the present invention.

Please refer to FIGS. 1 and 2 for a first preferable embodiment of the present invention. A percussion apparatus 1 for sputum clearance of the present invention includes a percussion unit 2, a drive unit 3, and a control unit 4.

The percussion unit 2 includes a reference plane A and an angle detector 23, the angle detector 23 is configured to detect an included angle θ between the reference plane A and horizontal plane X. The control unit 4 is configured to determine whether the included angle θ conforms to a preset angle. When the included angle θ conforms to the preset angle, the control unit 4 controls the drive unit 3 to drive the percussion unit 2 to periodically percuss. Preferably, the preset angle ranges between 0-45 degrees, which allows adjustment of using the percussion apparatus for sputum clearance according to various conditions. The angle detector 23 may include a mercury switch, gyroscope, tilt switch, ball switch or other angle-detecting devices.

In this embodiment, the percussion unit 2 further includes a main body 21 and a percussion member 28 connected with the main body 21. The percussion member 28 is preferably cup-shaped, the percussion member 28 includes a cup bottom 281 and a cup side portion 282 which is connected with the cup bottom 281 and gradually expands outward. An end of the cup side portion 282 remote from the cup bottom 281 defines the reference plane A. The percussion member 28 can be driven by the drive unit 3 to periodically percuss (vibrate or the like) in a normal direction B normal to the reference plane A.

The drive unit 3 further includes a drive member 31 connected with the percussion member 28. In this embodiment, the drive member 31 may be a periodically percussing element that generates periodical percussion through energization, and the periodically percussing element that generates periodical percussion due to energization is the existing technology, so this will not further explain its principle here. In other embodiments, the drive member 31 may include a motor and a cam mechanism, and the reciprocation can be carried out by driving the cam mechanism by the motor. In other embodiments, the drive member 31 may include an electromagnetic mechanism to carry out the reciprocation. Since the mechanism for generating the reciprocation is a general technology, it is no further explanation here. Whereby, the drive member 31 can be controlled to periodically percuss to drive the percussion member 28 to periodically percuss.

The control unit 4 is electrically connected with the drive unit 3 and the angle detector 23. When the included angle θ conforms to the preset angle, the control unit 4 controls the drive member 31 to drive the percussion member 28 to periodically percuss in the normal direction B.

In use, the percussion apparatus for sputum clearance is placed on a user (such as the chest), with the reference plane A of the percussion unit 2 contacting and in parallel with a region C of the user (FIG. 2), wherein the included angle between the reference plane A and the horizontal plane X is equal to the included angle between the region C and the horizontal plane X. The angle of the reference plane A of the percussion apparatus for sputum clearance is adjusted according to various regions of the user. When the control unit 4 determine that the included angle θ between the reference plane A and the horizontal plane X conforms to the preset angle, it means that the region C of the user is in the proper position for sputum clearance. For example, when the user lies flat so that the region C and the horizontal plane X are in parallel, the control unit 4 can control the drive member 31 to periodically percuss to drive the percussion member 28 to periodically percuss in the normal direction B normal to the region C of the user. Whereby, the sputum in the chest can flow from the bronchi to the trachea, to smoothly discharge the sputum, because of the vibration.

Figure 3:
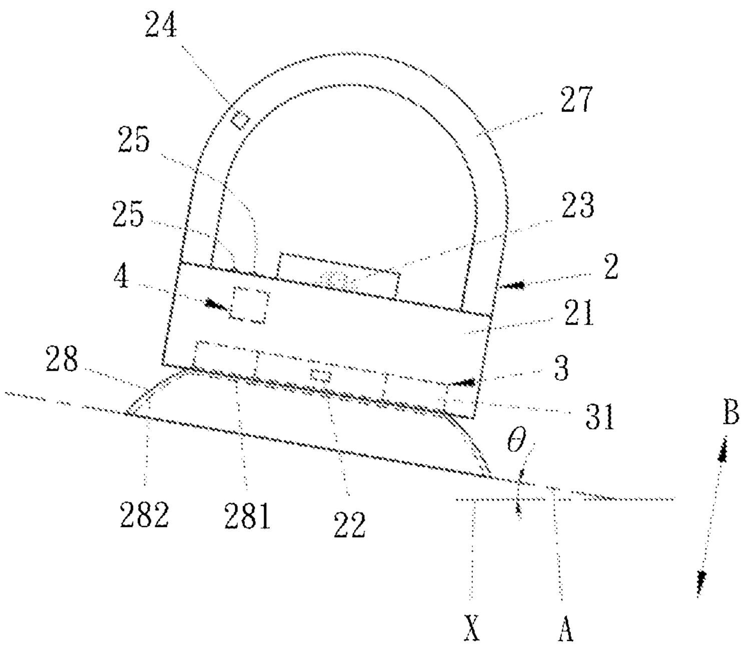
FIG. 3 is a drawing of a percussion apparatus for sputum clearance according to a second preferable embodiment of the present invention.
Figure 4:
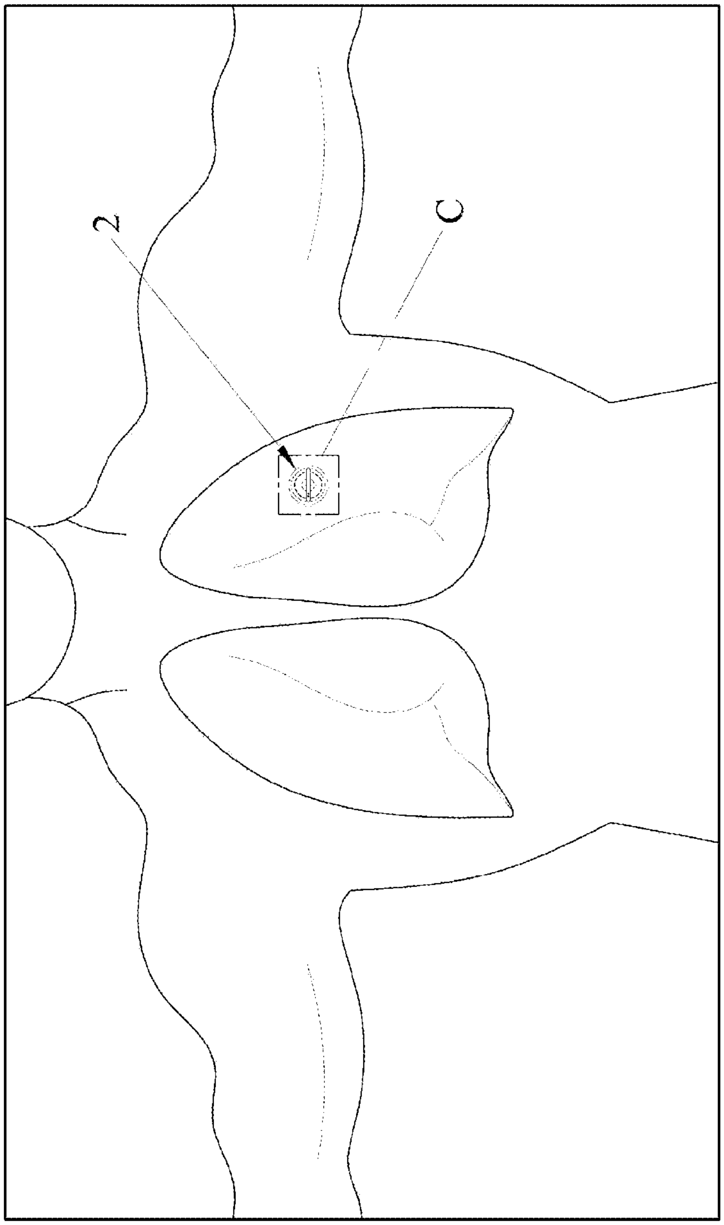
FIG. 4 is a drawing showing application of the percussion apparatus for sputum clearance according to the second preferable embodiment of the present invention.

Please refer to FIGS. 3 and 4 for a second embodiment, wherein the differences between the second embodiment and the first embodiment are described as follow.

The percussion unit 2 further includes sound receiver 22. In this embodiment, the sound receiver 22 is disposed on the main body 21 and configured to transform the received sound into a received signal and transmit to the control unit 4. The sound receiver 22 is adjacent to the cup bottom 281, and the percussion member 28 which is cup-shaped can enhance the sound receiving effect. The percussion unit 2 may further include an operation switch 24 which can generate a trigger signal when triggered. For example, the user can be initiative to trigger the operation switch 24 to generate the trigger signal, which improves operator control.

The percussion unit 2 may further include a display 25. In this embodiment, the display 25 is configured to generate a sputum-existence signal and an angle signal. In this embodiment, the display 25 may include lights of different colors to show different status of sputum-existences and angles. In other embodiments, the display 25 may include a sounder configured to generate different sounds to show different status of sputum-existences and angles, or the display 25 may display different texts to show different status of sputum-existences and angles.

The control unit 4 is electrically connected with the percussion unit 2, the sound receiver 22, the operation switch 24 and display 25. The control unit 4 can determine whether the received signal of the sound receiver 22 conforms to the preset sound wave characteristic. For example, the sound receiver 22 is arranged corresponding to the region C of the user, and when the received signal of the sound receiver 22 conforms to the preset sound wave characteristic, it is determined that there is sputum at the region C of the user. The preset sound wave characteristic may be in waveform, spectra, period or other parameters that can characterize sound waves. When the received signal conforms to the preset sound wave characteristic, the included angle θ conforms to the preset angle and the operation switch 24 generates the trigger signal, the control unit 4 controls the drive member 31 to drive the percussion member 28 to periodically percuss in the normal direction B, and the control unit 4 controls the display 25 to generate the sputum-existence signal and the angle signal. The control unit 4 may automatically drive the percussion member 28 to periodically percuss when the received signal conforms to the preset sound wave characteristic and the included angle θ conforms to preset angle.

In this embodiment, the percussion apparatus for sputum clearance further includes a handle 27 connected to the main body 21, for easy grip. During operation, it is to grip the handle 27 and make the reference plane A of the percussion member 28 on the user, and the percussion apparatus for sputum clearance is moved near the sputum-existence region, and when control unit 4 determines that the received signal conforms to the preset sound wave characteristic, the control unit 4 controls the display 25 to generate the sputum-existence signal (such as lighting a yellow light), which means that the sputum-existence region (region C) is found and determined. Then, the posture of the user is adjusted to make the region C in a suitable angle (such as in parallel with the horizontal plane X (FIG. 4)) for sputum clearance. When the control unit 4 determines that the included angle θ between the reference plane A and the horizontal plane X conforms to the preset angle, the control unit 4 controls the display 25 generates the angle signal (such as lighting a green light), the operator can ensure that the percussion apparatus for sputum clearance is arranged at the suitable position, and the operator can trigger the operation switch 24 to generate the trigger signal and the control unit 4 controls the drive member 31 to drive the percussion member 28 to pat the region C so that the sputum can be effectively discharged because of vibration. As a result, the second embodiment can also achieve pretty good effect of sputum clearance as that of the first embodiment.

Figure 5:
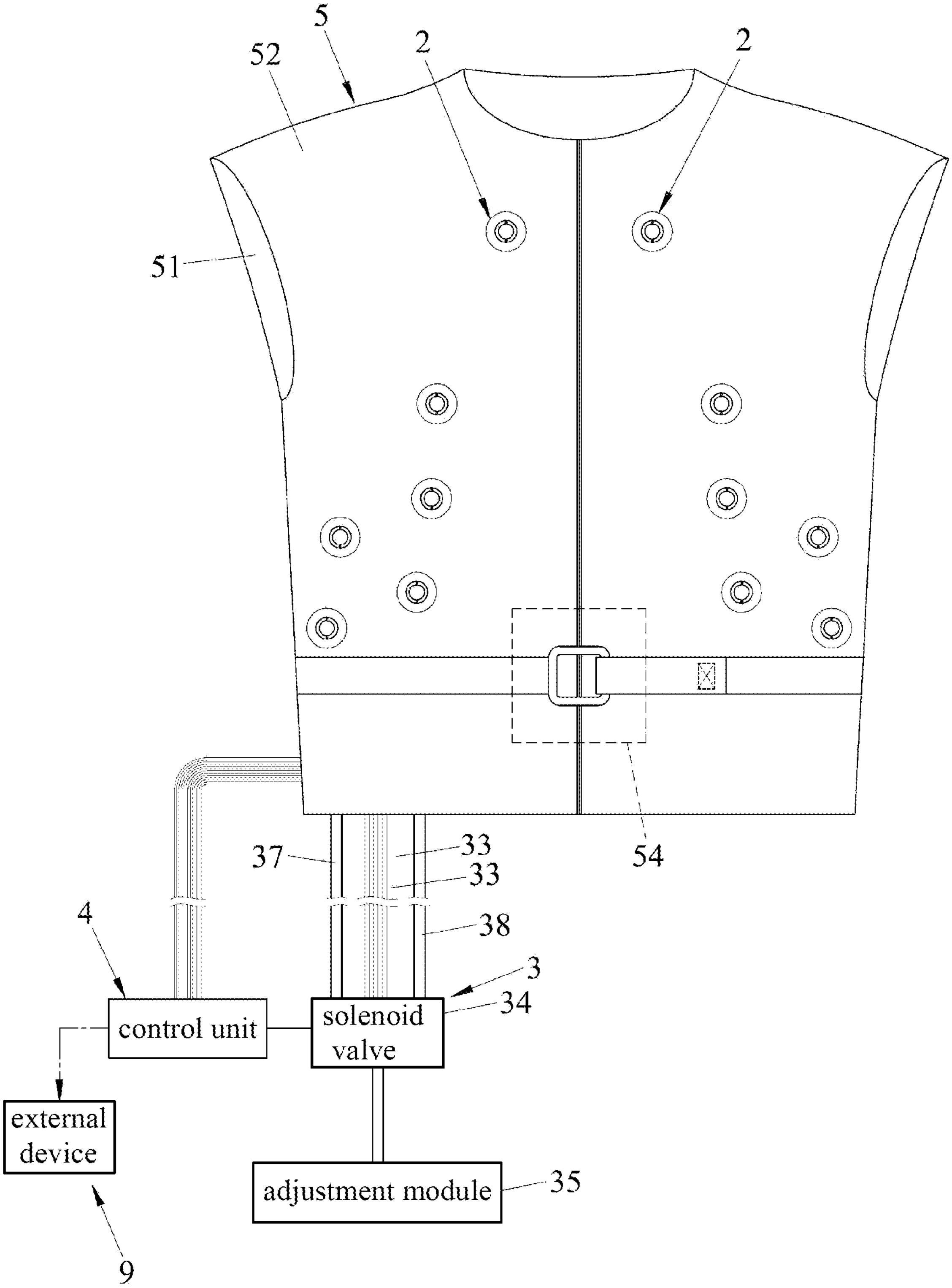
FIG. 5 is a front view of a percussion apparatus for sputum clearance with an external device according to a third preferable embodiment of the present invention.
Figure 6:
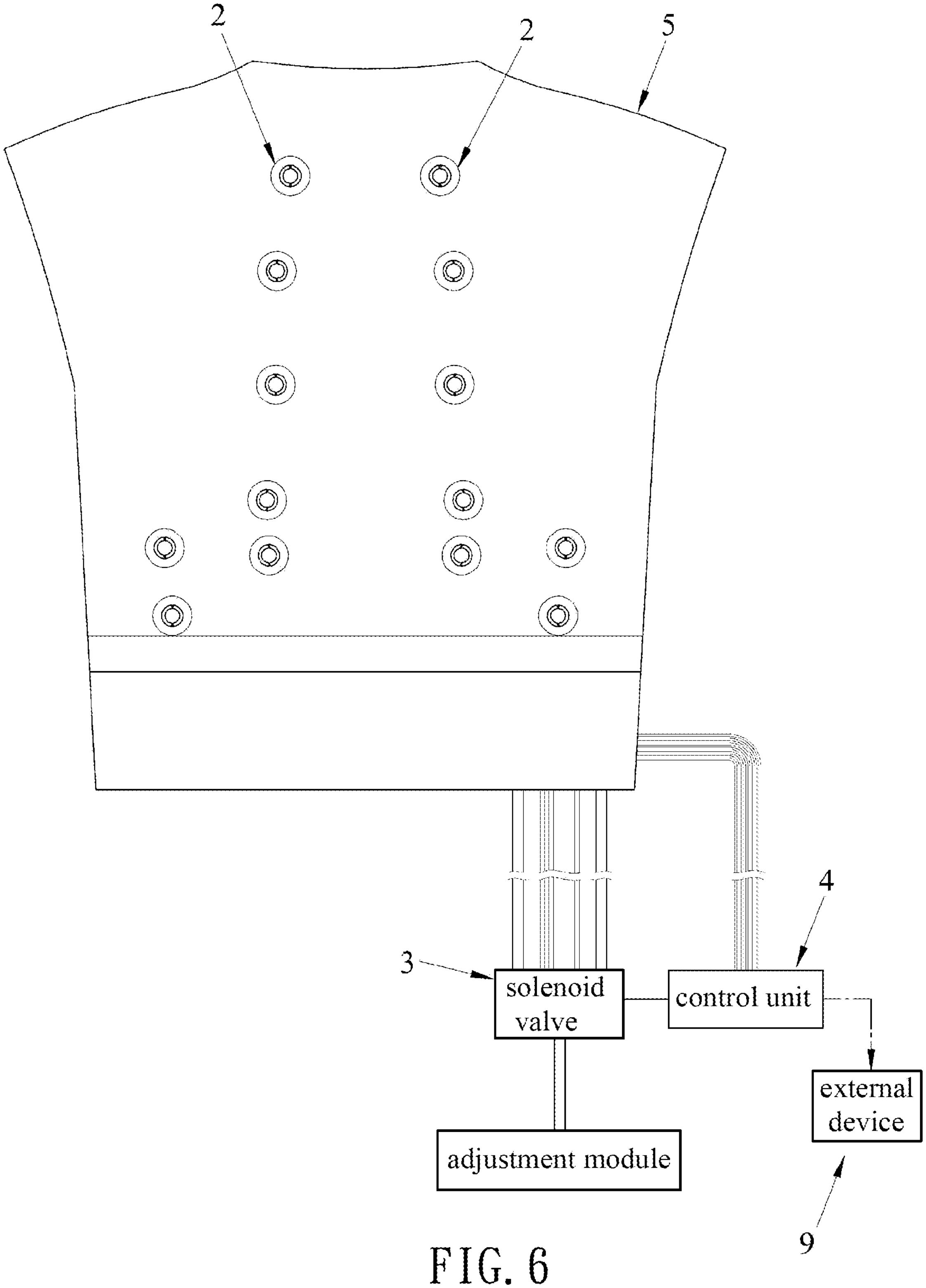
FIG. 6 is a rear view of the percussion apparatus for sputum clearance with the external device according to the third preferable embodiment of the present invention.
Figure 7:
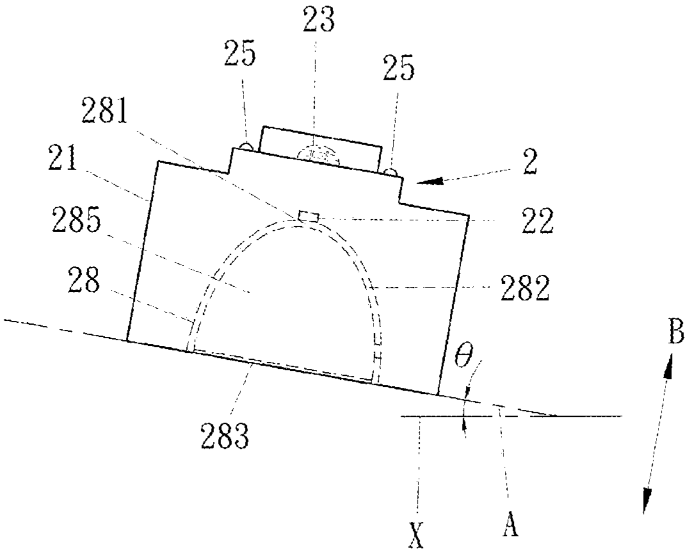
FIG. 7 is a drawing of a percussion unit according to the third preferable embodiment of the present invention.

Please refer to FIGS. 5 to 7 for a third preferable embodiment. The difference between the third preferable embodiment and the second embodiment is that the third preferable embodiment is wearable type but not handy type.

In this embodiment, the percussion apparatus for sputum clearance includes a plurality of percussion units 2, a drive unit 3, a control unit 4, and a wearable member 5 configured for wearing on a user. The plurality of percussion units 2 are disposed on the wearable member 5, each of the plurality of percussion units 2 includes a main body 21, a sound receiver 22, an angle detector 23, a display 25 and a percussion member 28 defining a reference plane A.

Figure 8:
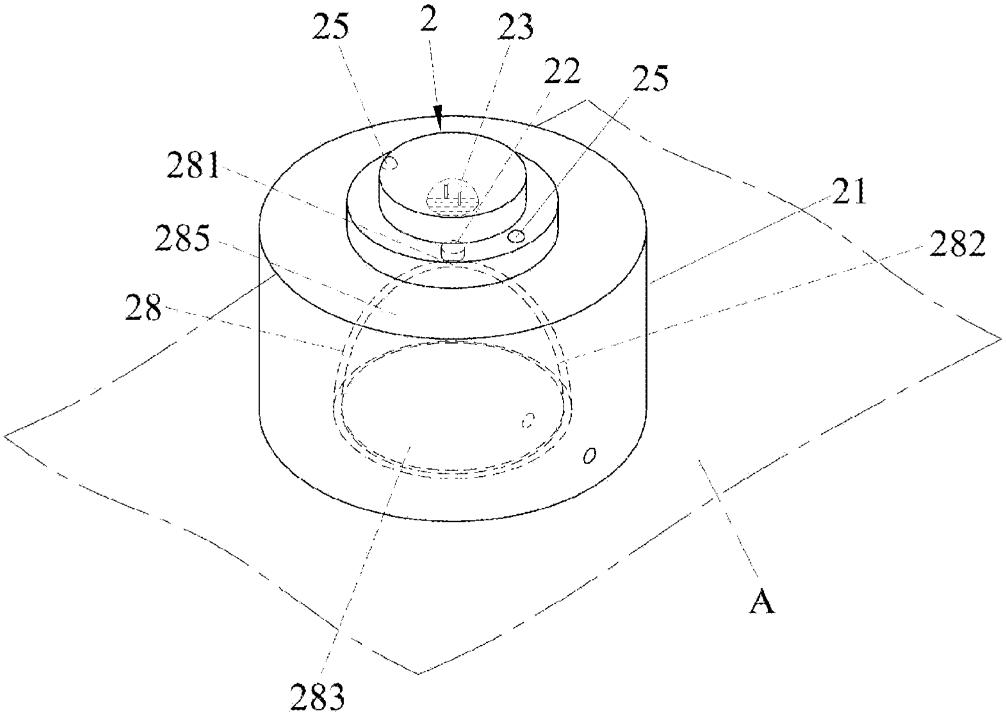
FIG. 8 is a stereogram of the percussion unit according to the third preferable embodiment of the present invention.
Figure 9:
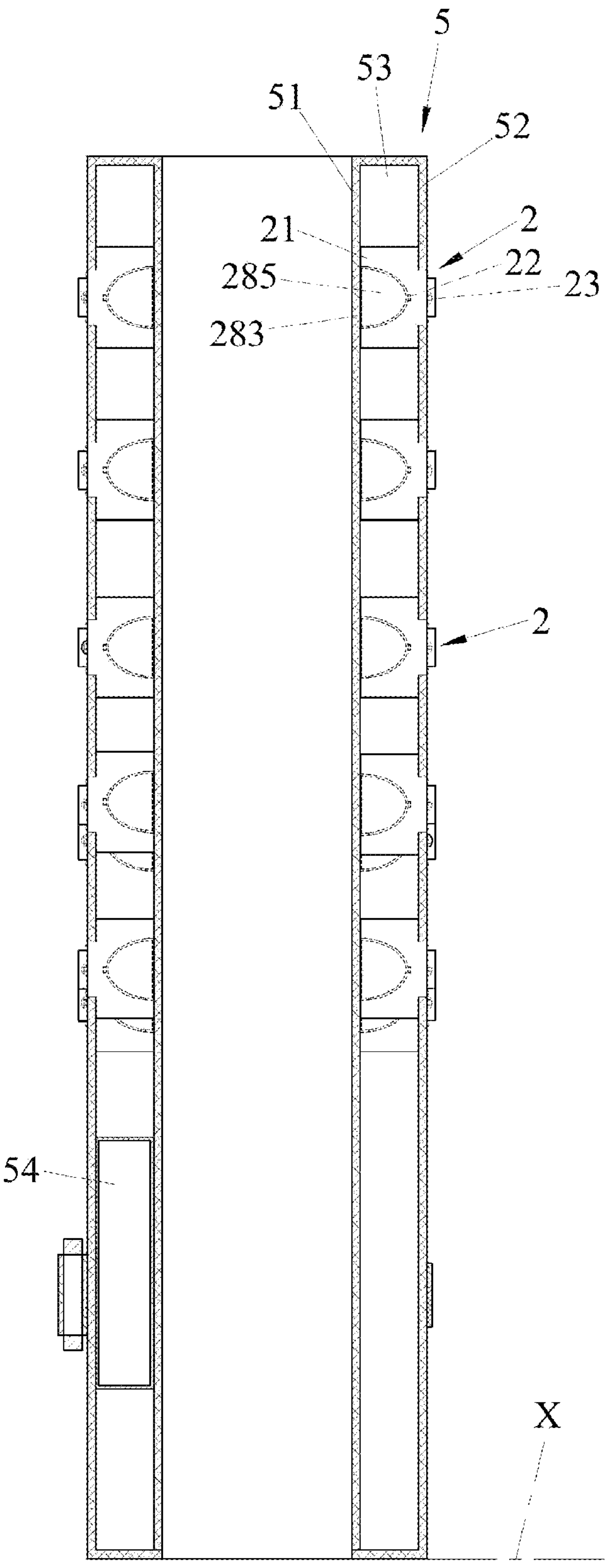
FIG. 9 is a cross-sectional view of the third preferable embodiment of the present invention.

Please refer to FIGS. 5, 8 and 9, the wearable member 5 includes an inner layer 51, an outer layer 52 and an airbag 54, the inner layer 51 is configured for mounting of the plurality of percussion units 2 and for contacting the user, the inner layer 51 and the outer layer 52 together define space 53, and the airbag 54 is disposed in the space 53 and configured to be arranged corresponding to an abdomen of the user. The plurality of percussion units 2 are disposed within the space 53, and the percussion member 28 of each of the plurality of percussion units 2 can move to drive the inner layer 51 to periodically percuss. The percussion member 28 of each of the plurality of percussion units 2 further includes a chamber 285 and an elastic member 283 connected to the chamber 285, wherein the elastic member 283 defines the reference plane A of the percussion unit 2. The sound receiver 22 and/or the angle detector 23 may be disposed in the main body 21 of each of the plurality of percussion units 2. In other embodiments, the sound receiver 22 or the angle detector 23 of each of the plurality of percussion units 2 may be disposed on the inner layer 51 of the wearable member 5 and adjacent to the main body 21. In other embodiments, adjacent ones of the plurality of percussion units 2 may cooperate with the same sound receiver 22 and the same angle detector 23.

Figure 10:
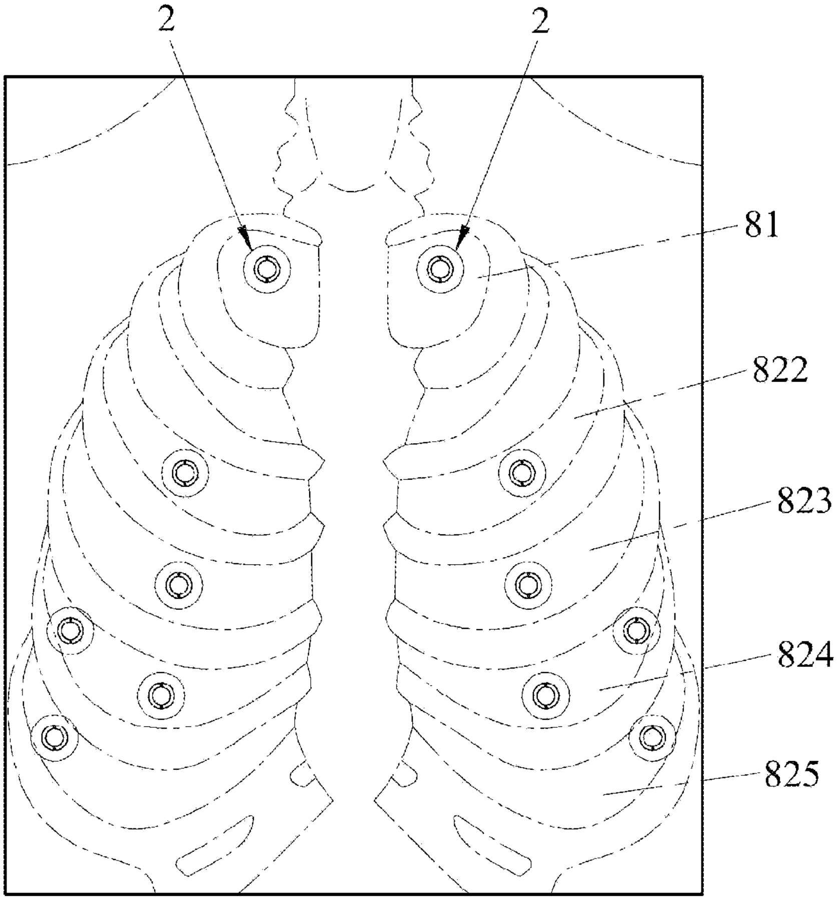
FIG. 10 is a drawing showing positional relationship of percussion units on the front of the human chest and at the front side of lung lobes.

Please refer to FIGS. 5 and 10, the plurality of percussion units 2 are configured to be arranged corresponding to two lung lobes of the user. The details are described as follows. Two of the plurality of percussion units 2 are configured to be arranged corresponding to clavicles 81 of the user which are located at a front side of the two lung lobes, for percussing the right apical upper lobe and the left apical posterior upper lobe; two of the plurality of percussion units 2 are configured to be arranged corresponding to second intercostals 822 of the user which are located at the front side of the two lung lobes, for percussing the right anterior upper lobe and the left anterior upper lobe; two of the plurality of percussion units 2 are configured to be arranged corresponding to third intercostals 823 of the user which are located at the front side of the two lung lobes, for percussing the right anterior upper lobe and the left superior of lingula upper lobe; two of the plurality of percussion units 2 are configured to be arranged corresponding to fourth intercostals 824 of the user which are located at the front side of the two lung lobes and are configured to be arranged adjacent to central portions of the two lung lobes, for percussing the right medial middle lobe and the left inferior of lingula upper lobe; two of the plurality of percussion units 2 are configured to be arranged corresponding to the fourth intercostals 824 of the user which are located at the front side of the two lung lobes and are configured to be arranged remote from the central portions of the two lung lobes, for percussing the right lateral middle lobe and the left inferior of lingula upper lobe; and two of the plurality of percussion units 2 are configured to be arranged corresponding to fifth intercostals 825 of the user which are located at the front side of the two lung lobes and are configured to be arranged remote from the central portions of the two lung lobes, for percussing the right anterior basal lower lobe and the left anterior-medial basal lower lobe.

Figure 11:
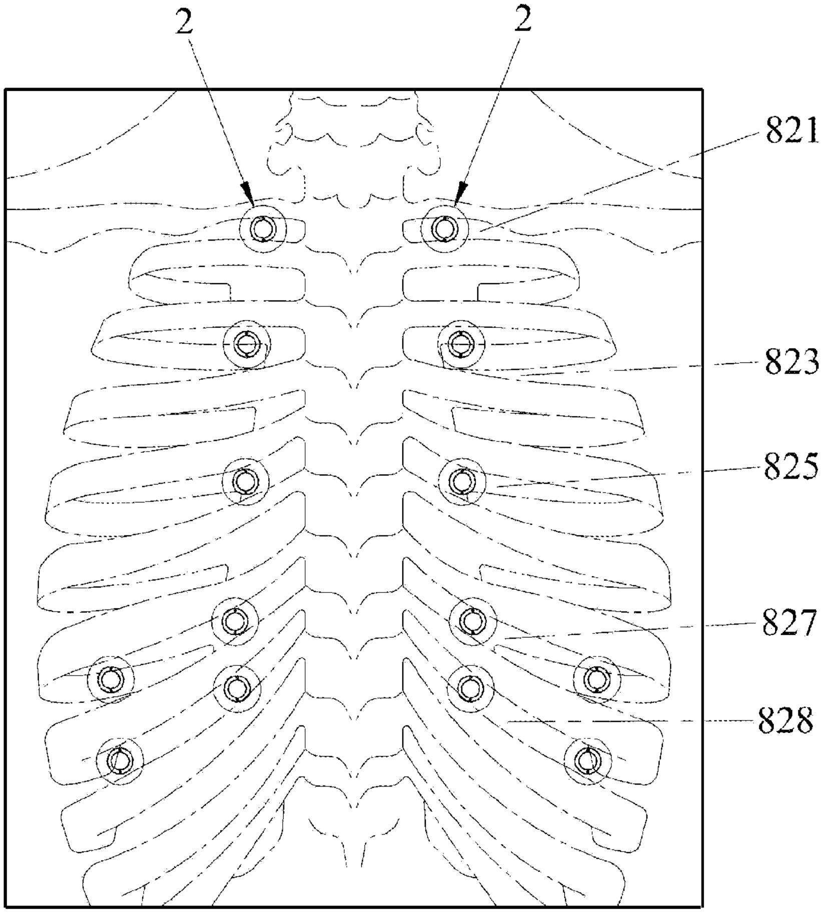
FIG. 11 is a drawing showing positional relationship of percussion units on the back of the human body and at the rear side of lung lobes.

Please refer to FIGS. 6 and 11, two of the plurality of percussion units 2 are configured to be arranged corresponding to first intercostals 821 of the user which are located at a rear side of the two lung lobes, for percussing the right apical upper lobe and the left apical posterior upper lobe; two of the plurality of percussion units 2 are configured to be arranged corresponding to third intercostals 823 of the user which are located at the rear side of the two lung lobes, for percussing the right posterior upper lobe and the left apical posterior upper lobe; two of the plurality of percussion units 2 are configured to be arranged corresponding to fifth intercostals 825 of the user which are located at the rear side of the two lung lobes, for percussing the right superior lower lobe and the left superior lower lobe; two of the plurality of percussion units 2 are configured to be arranged corresponding to seventh intercostals 827 of the user which are located at the rear side of the two lung lobes and are configured to be arranged adjacent to central portions of the two lung lobes, for percussing right posterior basal lower lobe and the left posterior basal lower lobe; two of the plurality of percussion units 2 are configured to be arranged corresponding to the seventh intercostals 827 of the user which are located at the rear side of the two lung lobes and are configured to be arranged remote from the central portions of the two lung lobes, for percussing the right anterior basal lower lobe and the left anterior-medial basal lower lobe; two of the plurality of percussion units 2 are configured to be arranged corresponding to eighth intercostals 828 of the user which are located at the rear side of the two lung lobes and are configured to be arranged adjacent to the central portions of the two lung lobes, for percussing the right posterior basal lower lobe and the left posterior basal lower lobe; and two of the plurality of percussion units 2 are configured to be arranged corresponding to the seventh intercostal eighth intercostals 828 of the user which are located at the rear side of the two lung lobes and are configured to be arranged remote from the central portions of the two lung lobes, for percussing the right lateral basal lower lobe and the left lateral basal lower lobe.

Please refer to FIGS. 5, 7 and 9. The drive unit 3 includes a plurality of first air ducts 33, a solenoid valve 34, an adjustment module 35, a second air duct 37 and a third air duct 38. The plurality of first air ducts are each inserted within the main body 21 and in communication with the chamber 285 of one of the plurality of percussion units 2. The solenoid valve 34 is connected with the plurality of first air ducts 33 and electrically connected with the control unit 4, and the solenoid valve 34 is controlled by the control unit 4 to be in communication with or not in communication with respective ones of the plurality of first air ducts 33. The adjustment module 35 is connected with the solenoid valve 34 and configured to provide a positive or negative pressure. The second air duct 37 is in communication with the airbag 54 and the solenoid valve 34. The third air duct 38 is in communication with the space 53 and the solenoid valve.

When the any one of the included angle θ associated one of the plurality of percussion units 2 conforms to the preset angle, the control unit 4 controls the solenoid valve 34 to make the adjustment module 35 in communication with an associated one of the plurality of first air ducts 33 so that the positive or negative pressure is applied to an associated one of the chamber 285 to drive an associated one of the elastic member 283 to periodically percuss. The elastic member 283 can periodically percuss in the normal direction B normal to the reference plane A.

The control unit 4 can control the solenoid valve 34 to make the adjustment module 35 in communication with the second air duct 37 so that the airbag 54 is inflated to press the abdomen of the user. The control unit 4 can control the solenoid valve 34 to make the adjustment module 35 in communication with third air duct 38 so that the space 53 is charged by gas to urge the inner layer 51 to fit to the user.

The control unit 4 can transmit the any one of the included angle θ associated one of the plurality of percussion units 2, the received signal and/or operation status of the drive unit 3 to an external device 9. In this embodiment, the external device 9 is a mobile device such as a smart phone (but not limited thereto). The external device 9 can be used to record the operation status of the percussion apparatus for sputum clearance for subsequent inspection. The respective control units 4 in the first and second embodiments can transmit the aforementioned data to the external device 9.

In use, the wearable member 5 is put on the user, the control unit 4 controls the solenoid valve 34 to make the adjustment module 35 in communication with the third air duct 38 to charge gas into the space 53 so that the inner layer 51 and the percussion unit 2 are urged to fit to the user. Since the percussion units 2 are arranged corresponding to the two lung lobes of the user, when the control unit 4 determines that any one of the received signal of the sound receiver 22 associated one of the plurality of percussion units 2 conforms to the preset sound wave characteristic, and when the included angle θ (between the reference plane A and the horizontal plane X) associated one of the plurality of percussion units 2 conforms to the preset angle, control the solenoid valve 34 makes the adjustment module 35 in communication with an associated one of the plurality of first air ducts 33 so that the positive or negative pressure controlled by the adjustment module 35 is applied to an associated one of the chamber 285 to drive an associated one of the elastic member 283 to periodically percuss, wherein the inner layer 51 can transmit the percussing force to corresponding regions of the user. The control unit 4 can trigger the percussion units 2 at different positions to periodically percuss according to the detection results of the angle detector 23 and the sound receiver 22, thus achieving the effect of sputum-removing.

After sputum-removing, the control unit 4 can control the solenoid valve 34 to make the adjustment module 35 in communication with the second air duct 37 so that the airbag 54 can be instantly inflated to quickly press the user's abdomen, thereby assisting the user to cough.

In this way, the third embodiment can also achieve the same purpose and effect as the above-mentioned first embodiment, and can achieve the effect of automatic sputum clearance.

Given the above, through at least one percussion unit 2, the control unit 4 can use the angle detector 23 to allow the user to adjust the angle of the body to draw sputum at the proper angle; the sound receiver 22 can be used to more accurately identify the body region where the sputum is located; and the drive unit 3 can be used to drive the percussion unit 2 to periodically percuss to assist sputum clearance. Compared with the conventional manual sputum clearance, it can greatly save the manpower and increase the efficiency of sputum clearance, so it can indeed achieve the purpose and object of the present invention.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A percussion apparatus for sputum clearance, including:

a percussion unit, including a percussion member and an angle detector, the angle detector being configured to detect an included angle between a reference plane and a horizontal plane;

a drive unit; and a control unit, electrically connected with the drive unit, wherein when the included angle conforms to a preset angle, the control unit controls the drive unit to drive the percussion unit to periodically percuss, wherein the percussion unit further includes a sound receiver, and when a received signal of the sound receiver conforms to a preset sound wave characteristic and the included angle conforms to the preset angle, the control unit controls the drive unit to drive the percussion unit to periodically percuss, and wherein the percussion member is cup-shaped, the percussion member includes a cup bottom which is adjacent to the sound receiver and a cup side portion which is connected with the cup bottom and gradually expands outward;

wherein the sound receiver is located between the reference plane and the angle detector, and the sound receiver is more adjacent to the cup bottom than the angle detector.

2. The percussion apparatus for sputum clearance of claim 1, wherein the percussion member which is driven by the drive unit to periodically percuss in a normal direction normal to the reference plane.

3. The percussion apparatus for sputum clearance of claim 1, wherein the preset angle ranges between 0-45 degrees.

4. The percussion apparatus for sputum clearance of claim 2, wherein the percussion unit further includes a main body, and the angle detector and the sound receiver are disposed on the main body.

5. The percussion apparatus for sputum clearance of claim 4, wherein an end of the cup side portion remote from the cup bottom defines the reference plane.

6. The percussion apparatus for sputum clearance of claim 5, wherein the cup side portion is configured to contact a region of a user, and the region and the reference plane are in parallel.

7. The percussion apparatus for sputum clearance of claim 1, wherein the angle detector is a mercury switch, a gyroscope, a tilt switch or a ball switch.

* * * * *